Sept. 10, 1957 O. GRIES 2,805,460
UNITARY DIE CAST CUP HOOK
Filed March 16, 1953
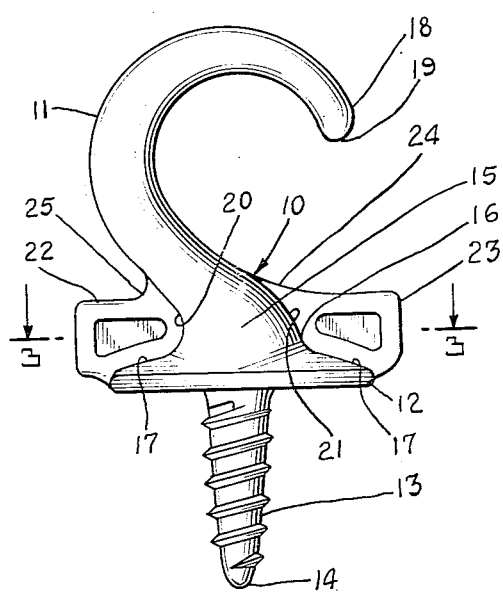
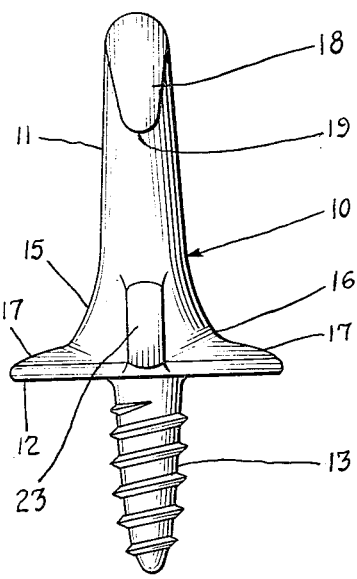
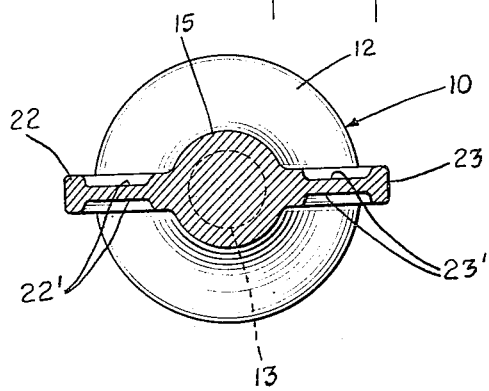
INVENTOR
OTTO GRIES
BY
ATTORNEY United States Patent Office 2,805,460
Patented Sept. 10, 1957

2,805,460

UNITARY DIE CAST CUP HOOK

Otto Gries, New Rochelle, N. Y., assignor to Gries Reproducer Corporation, New Rochelle, N. Y., a corporation of New York Application March 16, 1953, Serial No. 342,581

3 Claims. (Cl. 24—230.5)

This invention relates to what are generally known as cup hooks used for mounting in connection with a support of any type and kind for the hanging of articles on the support, devices of this type and kind being generally known in the trade as a cup hook being utilized to support or hang cups from the underside of a shelf or other support.

More particularly, the invention deals with a cup hook formed as a unitary die cast body, wherein the enlarged base of the cup hook includes laterally extending reinforcing and fingerpiece portions facilitating operation of attachment and detachment of the device with respect to a support, while at the same time materially strengthening the hook structure.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a side view of a cup hook made according to my invention.

Fig. 2 is an edge view thereof; and

Fig. 3 is a section on the line 3—3 of Fig. 1.

With cup hooks of the type and kind under consideration as commonly known up to a period of a few years ago, these cup hooks have been made from a strand of wire, on which is disposed a sheet metal sleeve or disc, forming a surface engaging member. Hooks of this type and kind have been objectionable and impractical, first from the standpoint of the common distortion of the disc and, secondly, from the standpoint of the weakness in the hook structure outwardly of the disc and, still further, from the standpoint of ability to rotate the device in coupling and uncoupling the same with respect to a support.

The purpose of my present invention is to provide a strong and durable cup hook device preferably made in the form of a unitary die cast body, wherein the disc portion is integral with the screw and hook portions of the device, further, wherein the hook portion has a reinforced mounting with respect to the disc to give greater strength and rigidity to the device and, still further, in providing oppositely extending reinforcing and fingerpiece portions which further reinforce the juncture of the hook with the disc and also provide large fingerpiece portions which facilitate attachment and detachment of the cup hook with respect to a support. Opposed surfaces of the fingerpiece portions are preferably hollowed to provide a secure grip and also to minimize the overall weight of the resulting device.

In the drawing, 10 represents a cup hook made according to my invention, the cup hook having a hook-shaped end 11, a base or disc 12, from the lower central surface of which extends a screw portion 13 having a lower substantially pointed end 14. The hook 11 extends from the disc 12 in a shank portion 15 which flares onto the disc 12, as is clearly illustrated at 16 in Figs. 1 and 2 of the drawing, the flare 16 joining in an outwardly extending and slightly rounded surface 17 terminating at the peripheral edge of the disc. This construction provides a very strong engagement of the hook 11 with the disc, as will be apparent. The hook 11 also extends from the shank 15 in a continuously tapering manner to the terminal end 18 of the hook, the latter being directed toward the disc 12 and being slightly rounded, as seen at 19.

The extension of the hook 11 from the disc 12 forms at one side of the shank a substantially V-shaped recess 20; whereas the other side of the shank is convexly curved or slightly domed, as seen at 21, note Fig. 1 of the drawing. Integral with the shank, part of the hook and the disc 12, are two fingerpiece portions 22, 23, the fingerpiece portion 22 bridging and partitioning the recess 20, thus forming a reinforcement between the hook 11 and disc 12, the other fingerpiece 23 providing a reinforcing rib extending from the base of the hook over the shank and the disc 12. The fingerpiece portions preferably extend beyond the peripheral edge of the disc, as clearly illustrated in Figs. 1 and 3, so as to provide the greatest possible leverage for ease of rotation of the cup hook in coupling and uncoupling the same with a support. This is particularly desirable when the material of the support is of such characteristics as to render attachment of the cup hook difficult.

The fingerpiece portions have recessed sides 22', 23' as clearly noted in Fig. 3 of the drawing. These recessed sides minimize the weight of the resulting cup hook and, at the same time, provide gripper surfaces into which the fingers of the hand can extend in providing a firm grip on the fingerpiece portions in the operation of coupling and uncoupling the hook device with a support.

The fingerpiece 23 has an upper curved surface 24 which extends into and conforms with the contour of the base of the hook 11, so as to facilitate placement of the articles on the hook and not minimize or obstruct normal clearance passage for engagement with the hook. The upper portion of the other fingerpiece 22 terminates at its inner end in an upwardly extended rounded portion 25 which adds to the bridging effect of the fingerpiece in giving strength to the hook mounting on the base or disc 12.

Having fully described my invention, what I claim as new and desire to secure by Letters Patent is:

1. A die cast cup hook of the character described, comprising a disc portion, a hook member at one side of the disc portion and having a tip and bight portion and integrally joining the disc portion in a flaring shank, said shank being defined by a concaved substantially V-shaped surface and an opposed convexed surface, the other side of the disc portion having, projecting therefrom centrally thereof, an integral screw part, oppositely extending fingerpiece portions extending integrally from the periphery of the disc portion and the convexed and concaved surfaces of said shank, and said fingerpiece portions lying in a plane passing through the tip, bight, and shank of the hook member and having ends extending beyond and upwardly from the periphery of said disc portion.

2. A die cast cup hook of the character described, comprising a disc portion, a hook member at one side of the disc portion and having a tip and bight portion and integrally joining the disc portion in a flaring shank, said shank being defined by a concaved substantially V-shaped surface and an opposed convexed surface, the other side of the disc portion having, projecting therefrom centrally thereof, an integral screw part, oppositely extending fingerpiece portions extending integrally from the periphery of the disc portion and the convexed and concaved surfaces of said shank, said fingerpiece portions lying in a plane passing through the tip, bight, and shank of the hook member and having ends extending beyond and upwardly from the periphery of said disc portion, and said fingerpiece portions having recessed opposed sides.

3. A die cast cup hook of the character described, comprising a hook member contracted from its inner end to its outer end, the inner end of the hook member having a flared shank integrally joining a thin disc and extending onto the peripheral edge of the disc, a substantially V-shaped recess at one side of the shank, a convex surface at the opposed side of the shank, an integral screw projecting centrally from the opposed surface of the disc, a pair of fingerpiece portions projecting integrally from the recessed and convex sides of said shank and disposed in a plane symmetrically bisecting said hook member, one of said fingerpiece portions bridging said V-shaped recess, and the other fingerpiece portion having an upper surface continuous with the corresponding surface of the hook member.

References Cited in the file of this patent

UNITED STATES PATENTS

| | | |
|---|---|---|
| D. 5,262 | Sargent | Sept. 12, 1871 |
| 252,919 | Woodward | Jan. 31, 1882 |
| 280,389 | Miles | July 3, 1883 |
| 635,297 | Caldwell | Oct. 24, 1899 |
| 769,873 | Paar | Sept. 13, 1904 |
| 1,103,723 | Witte | July 14, 1914 |
| 1,250,597 | Kyle | Dec. 18, 1917 |
| 1,548,128 | Fisher | Aug. 4, 1925 |
| 2,061,751 | Bosco | Nov. 24, 1936 |

FOREIGN PATENTS

| | | |
|---|---|---|
| 134,365 | Germany | Oct. 2, 1902 |
| 651,009 | Great Britain | Mar. 7, 1951 |